S. Thompson,
Faucet.

No. 111,018.  Patented Jan. 19, 1871.

Witnesses:
Fred. Haynes
R. W. Raburn

Samuel Thompson

United States Patent Office.

SAMUEL THOMPSON, OF SCHAGHTICOKE, NEW YORK.

Letters Patent No. 111,018, dated January 17, 1871.

IMPROVEMENT IN FAUCETS FOR BEER OR OTHER BARRELS.

The Schedule referred to in these Letters Patent and making part of the same.

*To all whom it may concern:*

Be it known that I, SAMUEL THOMPSON, of Schaghticoke, in the county of Rensselaer and State of New York, have invented a new and useful Improvement in Faucet Attachments or Connections of Beer and others Barrels with their Pumps, of which the following is a full, clear, and exact description, reference being had to the accompanying drawing forming part of this specification, and in which—

Figure 1:
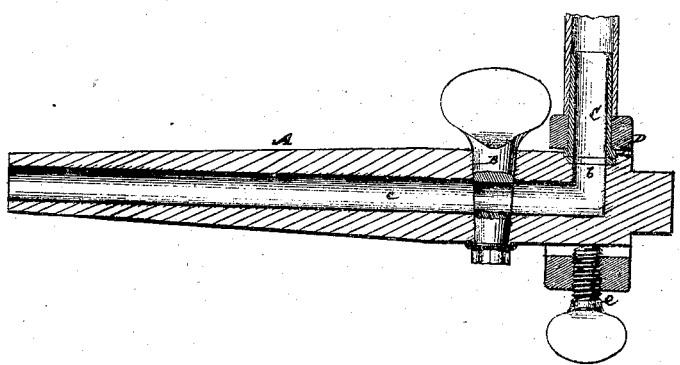
Figure 2:
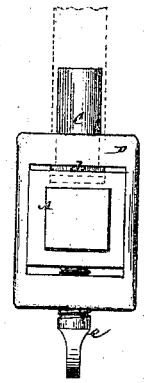

Figure 1 represents a longitudinal section of a faucet with my improvement applied thereto, and Figure 2, an end view of the same.

Similar letters of reference indicate corresponding parts.

My invention relates to faucet attachments for making the connection between beer and other barrels and the pumps used to draw off their contents, as in barrooms and other places drawing their supply from a cellar or cellars beneath; and My invention consists in a combination, with a faucet having its outlet arranged at right angles or thereabouts to its main bore, of a screw-clamp, constructed to fit as a sleeve over the outer end of the faucet, and provided with a coupling arranged to occupy an upward position in line with the outlet of the faucet, so that, on screwing down the clamp, said coupling, that has the pump-pipe attached to it, is made to form a close joint with the faucet.

This constitutes a very simple and effective means for making and breaking the connection between the pump and the faucet of the barrel, and allows of the connection being a straight and direct one, free from objectionable bends in the pump-pipe, and economizing space in making the attachment.

Referring to the accompanying drawing—

A represents the faucet of a barrel, and

B, the spigot.

The outlet $b$ from said faucet is arranged at right angles or thereabouts to the main bore $c$, and in the upper portion of the rear end of the faucet, said outlet being enlarged at its outer end to receive within it any suitable packing, and a flange or head, $d$, of a pipe-coupling, C, by which the connection is made with the pipe of the pump.

This coupling is fitted through the upper end of a sleeve or clamp, D, provided with a screw, $e$, at its lower end, and of a shape to fit freely over the square or other suitably-shaped outer end of the faucet, so as to be exempt from objectionable side play or shake thereon, with freedom for its up-and-down adjustment, to break and establish connection of the pump-pipe with the faucet, by tightening or slackening the screw $e$, and slipping off or on the clamp, as required.

Said screw-clamp D may be permanently attached by its coupling C to the pump-pipe before fitting it onto the faucet.

What is here claimed, and desired to be secured by Letters Patent, is—

The combination of the sleeve or clamp D with its screw $e$, the coupling C, and the faucet A, having its outlet $b$ arranged in relation with its bore, substantially as specified.

SAMUEL THOMPSON.

Witnesses:
 FRED. HAYNES,
 R. E. RABEAU.